No. 665,164. Patented Jan. 1, 1901.
W. P. BEAM.
COMBINED HARROW, DRAG, AND GRADER.
(Application filed Oct. 23, 1899.)

(No Model.)

WITNESSES
Frank Hudson
A. J. Barnett

INVENTOR
Waldo P Beam
By Atty N. DuBois,

THE NORRIS PETERS CO., PHOTO-LITHO., WASHINGTON, D. C.

UNITED STATES PATENT OFFICE.

WALDO P. BEAM, OF BEAMINGTON, ILLINOIS.

COMBINED HARROW, DRAG, AND GRADER.

SPECIFICATION forming part of Letters Patent No. 665,164, dated January 1, 1901.

Application filed October 23, 1899. Serial No. 734,580. (No model.)

*To all whom it may concern:*

Be it known that I, WALDO P. BEAM, a citizen of the United States, residing at Beamington, in the county of Sangamon and State of Illinois, have invented certain new and useful Improvements in a Combined Harrow, Drag, and Grader, of which the following is such a full, clear, and exact description as will enable those skilled in the art to which it appertains to make and use my said invention.

My invention relates to implements of that class commonly known as "slant-tooth" harrows.

The general purpose of my invention is to provide a harrow of the class described with appurtenances so constructed and arranged that the implement may be used as a harrow is ordinarily used for pulverizing the ground, may be used to level the ground, and may be used in grading roadways, race-tracks, &c., as hereinafter explained.

Having this general object in view, the specific purposes of my invention are to provide, in connection with a harrow of that class, a draft attachment of novel and improved construction, to provide a drag of novel and improved construction, to provide means for adjusting said drag with respect to its forward or rearward inclination, to provide means for the vertical adjustment of the drag, and to provide means for adjusting the drag with respect to its inclination in the transverse direction of the harrow.

With these ends in view my invention consists in the novel features of construction and combinations of parts shown in the annexed drawings, to which reference is hereby made, and hereinafter particularly described and claimed.

Figure 1:
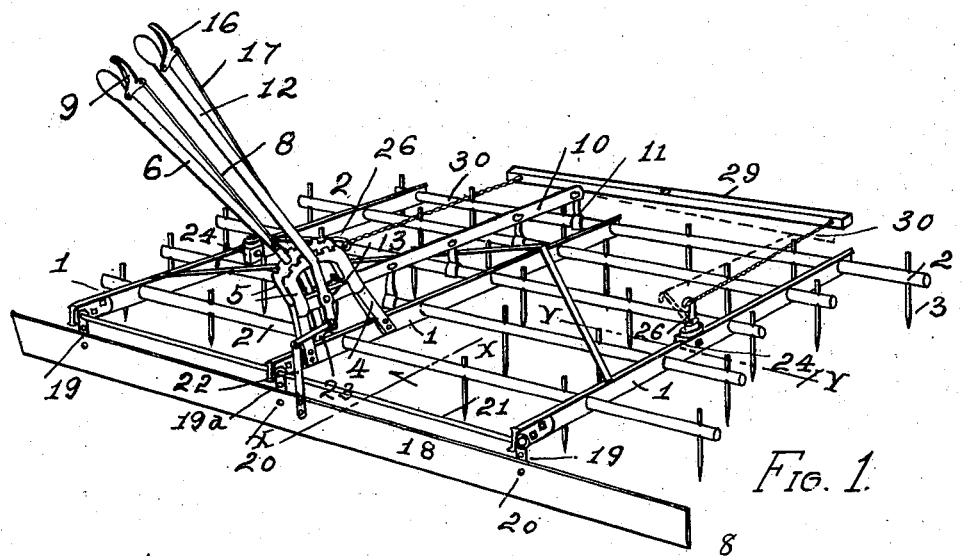
Figure 5:
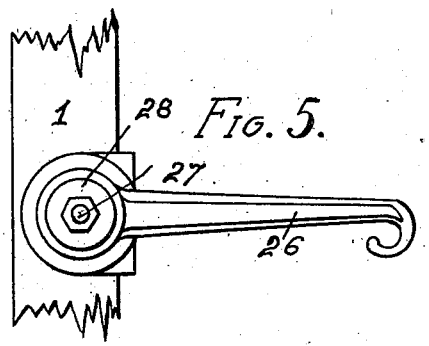
Figure 2:
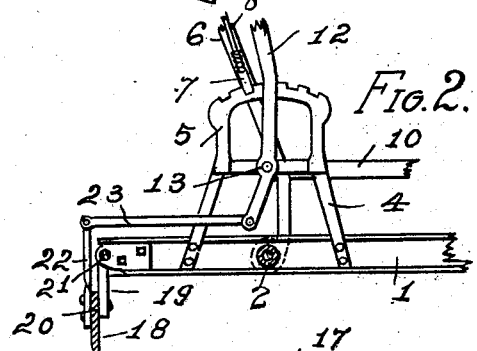
Figure 4:
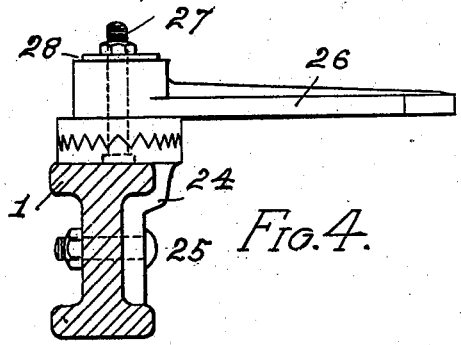
Figure 3:
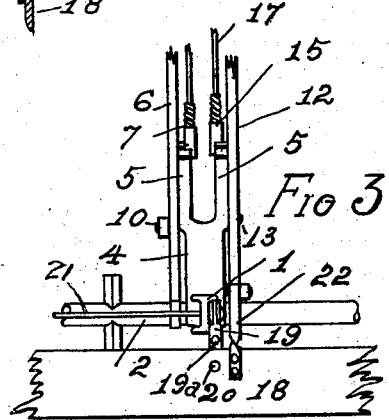

Referring to the drawings, Figure 1 is a perspective view of the complete implement. Fig. 2 is a partial vertical section, on an enlarged scale, taken on the line $x\ x$ of Fig. 1. Fig. 3 is an enlarged rear elevation of the central part of the implement. Fig. 4 is an enlarged partial vertical section in the line $y\ y$ of Fig. 1 and shows in side elevation one of the draft-hooks and the means for connecting same with the harrow-frame. Fig. 5 is an enlarged top plan of one of the draft-hooks in position on a side bar of the harrow-frame.

Similar numerals of reference designate like parts in all of the views.

The harrow proper consists of longitudinal channel-bars 1, traversed by tooth-bars 2, mounted to oscillate on the bars 1. Harrow-teeth 3 are secured to the bars 2. A standard 4 is secured in a vertical position on the central bar 1 and has at its upper extremity two parallel notched segment-plates 5. A lever 6 is fulcrumed on the rear tooth-bar 2 and carries a spring-latch 7, connected by a rod 8 with a grip-lever 9. The latch 7 engages in the notches of the segment-plate to retain the lever 6 in any position in which it may be set. By depressing the grip-lever 9 the latch 7 may be withdrawn, so as to permit movement of the lever 6 forward or backward. A bar 10 is pivotally connected with upwardly-extending arms 11, secured to the tooth-bars 2 in such manner that when the lever 6 is pushed forward the rod 10 will cause all of the bars 2 to turn, so as to give a rearward slant to all of the harrow-teeth, and when the lever is pulled backward the bars 2 will be turned to cause the teeth to slant forward. A lever 12 has its fulcrum 13 on the standard 4 and carries a latch 15, which engages with the notches in the segment-plate 5 to hold the lever 12 in the position in which it may be set. A grip-lever 16 is connected with the latch 15 by a rod 17. When the grip-lever 16 is depressed, the latch 15 is released, and the lever 12 may be shifted forward or backward at pleasure to vary the inclination of the drag or scraper, as hereinafter explained.

The scraper 18 preferably consists of a steel plate chisel-shaped at its lower edge, as shown. The scraper 18 is connected with the harrow by hinge members 19, in each of which there are a number of holes 19ª, adapted to receive bolts 20, which connect the hinge members with the scraper 18 in such manner as to permit the adjustment of the scraper in the longitudinal direction of the hinge members, to the end that the depth of cut of the scraper may be gaged independently of the forward or rearward inclination of the scraper. A rod 21 extends through the bars 1 and through the hinge members 19 and connects the hinge members with the bars. The hinge members 19 turn on the rod 21. A standard 22 is secured to and extends upwardly from the scraper 18. A rod 23 has one of its ends pivotally connected with the lower extremity of the lever 12 and its other end pivotally connected with the standard 22.

By means of the connection described forward movement of the upper end of the lever 12 produces forward inclination of the scraper 18, and rearward movement of the upper end of the lever produces rearward inclination of the scraper.

Blocks 24 are secured to the bars 1 by bolts 25 or other suitable means. The blocks are formed to fit in the channels of the bars, as shown, so as to form a stable connection of the blocks with the bars. The upper surfaces of the blocks are serrated, as shown.

The draft-hooks 26 are preferably of the form shown in Figs. 4 and 5 and have hubs provided with serrations which match the serrations in the top of the blocks 24. Bolts 27 extend vertically through the upper parts of the blocks 24 and through the hubs of the hooks 26 and connect the hooks with the blocks. Washers 28 underlie the nuts of the bolts 27 and bear against the upper ends of the hubs of the hooks. By unscrewing the nuts on the bolts 27 the hooks may be raised sufficiently to disengage the serrations and may be turned to any desired extent to change the draft of the implement, as hereinafter explained. When the hooks have been properly adjusted, the nuts are screwed down to hold the serrations in engagement and prevent displacement of the hooks. A transverse draft-bar 29 is connected with the hooks 26 by chains 30 or other suitable means. The doubletree to which the team is hitched is in practice centrally connected with the bar 29 by a clevis or other suitable connection.

By shifting the lever 6 forwardly or rearwardly any desired forward or rearward inclination may be given to the harrow-teeth.

By shifting the lever 12 forwardly or rearwardly any desired forward or rearward inclination may be given to the scraper, or the scraper may be set in a vertical position, as shown in Fig. 1 of the drawings.

By turning the hooks 26 on the bolts 27 the draft connection may be varied within the scope of the revolution of the hooks—that is to say, if the hitch is too far forward and the draft of the team forces the front harrow-teeth too deeply into the ground the hooks may be turned rearward, so as to bring the connections of the chains 30 with the hooks 26 back of the central transverse line of the harrow, and, on the other hand, if the hitch is too far rearward the hooks may be turned forward to move the hitch forward to the desired extent.

When it is desired to use the implement as a grader, the draft-hook on one side only may be turned rearward, as indicated in dotted lines in Fig. 1, thereby causing the scraper to assume a position transversely oblique to the line of the draft of the implement, with the result that the scraper draws toward the center of the roadway or race-track on which the implement is being used the dirt which has been loosened by the harrow-teeth. The quantity of dirt drawn by the scraper may be increased or diminished by vertically raising or lowering the scraper by setting the bolts 20 up or down in the holes 19$^a$ in the hinge members 19, so as to vary the depth of the cut of the scraper.

When the implement is used as a combined drag and harrow in pulverizing and leveling the ground, the hooks 26 are so adjusted that the draft of the implement is in a straight line perpendicular to the scraper 18. When so used, any desired slant may be given to the harrow-teeth by means of the lever 6, and any desired forward or rearward inclination may be given to the scraper 18 by means of the lever 12. When the implement is used in this way, the scraper 18 scrapes down any lumps which may have escaped the harrow-teeth and drags loose dirt into the holes and depressions in the ground, thus leaving the ground level and in good condition for seeding.

If it is undesirable to use the drag, it may be raised entirely away from the ground by throwing the lever 12 forward.

Having fully described my invention, what I claim as new, and desire to secure by Letters Patent, is—

In an implement of the class described, the combination of a central bar and side bars, tooth-bars mounted to oscillate on said central and side bars, a standard secured to said central bar and provided with a segment-plate, a scraper having a hinge connection with said central and side bars, a lever connected to oscillate said tooth-bars and having a latch engaging with said segment-plate, and a lever connected to oscillate said scraper and having a latch engaging with said segment-plate, as set forth.

In witness whereof I have hereunto subscribed my name, at Springfield, Illinois, this 9th day of September, 1899.

WALDO P. BEAM.

Witnesses:
ELMER E. PARK,
W. F. HERNDON.